UNITED STATES PATENT OFFICE.

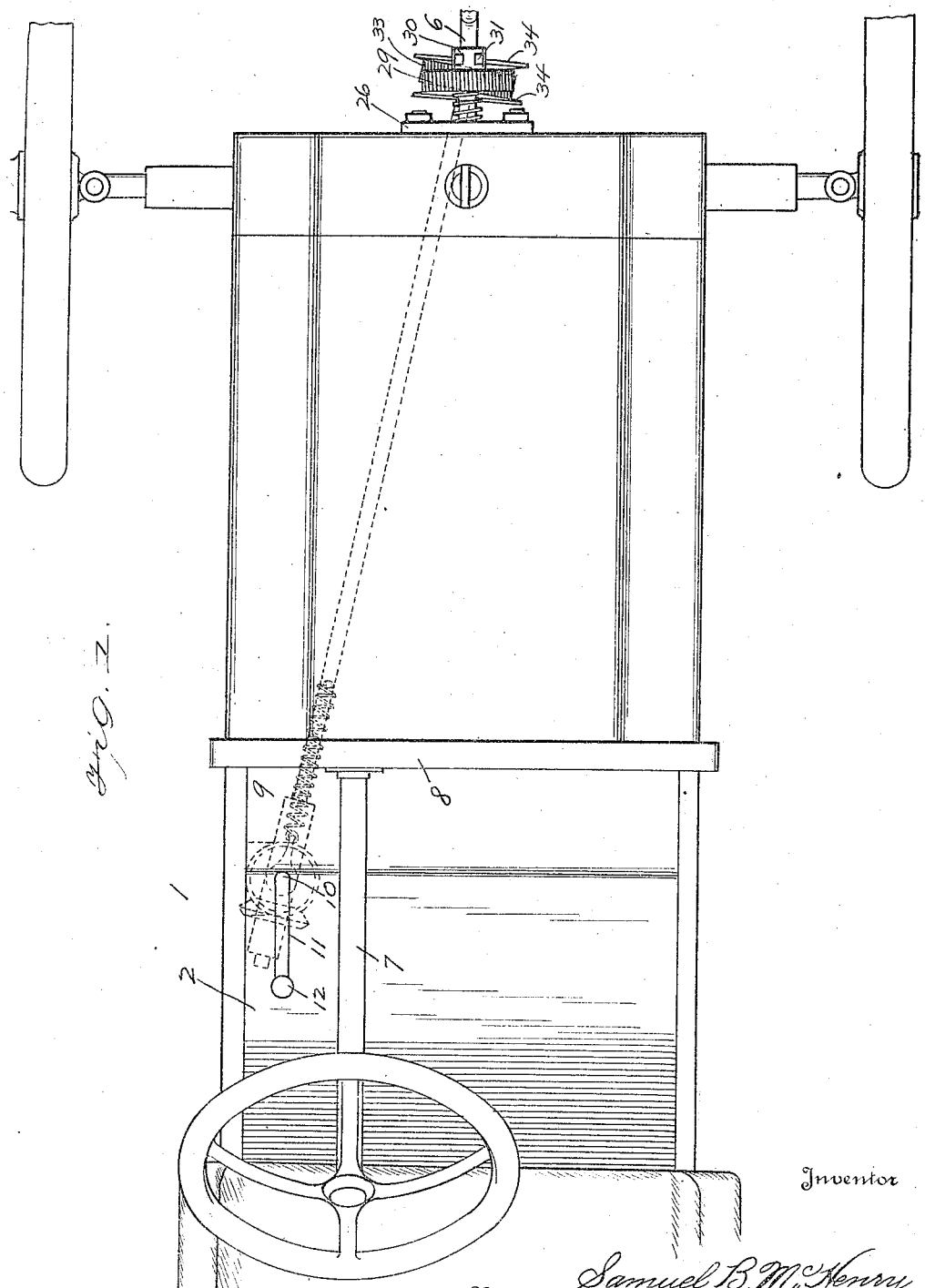

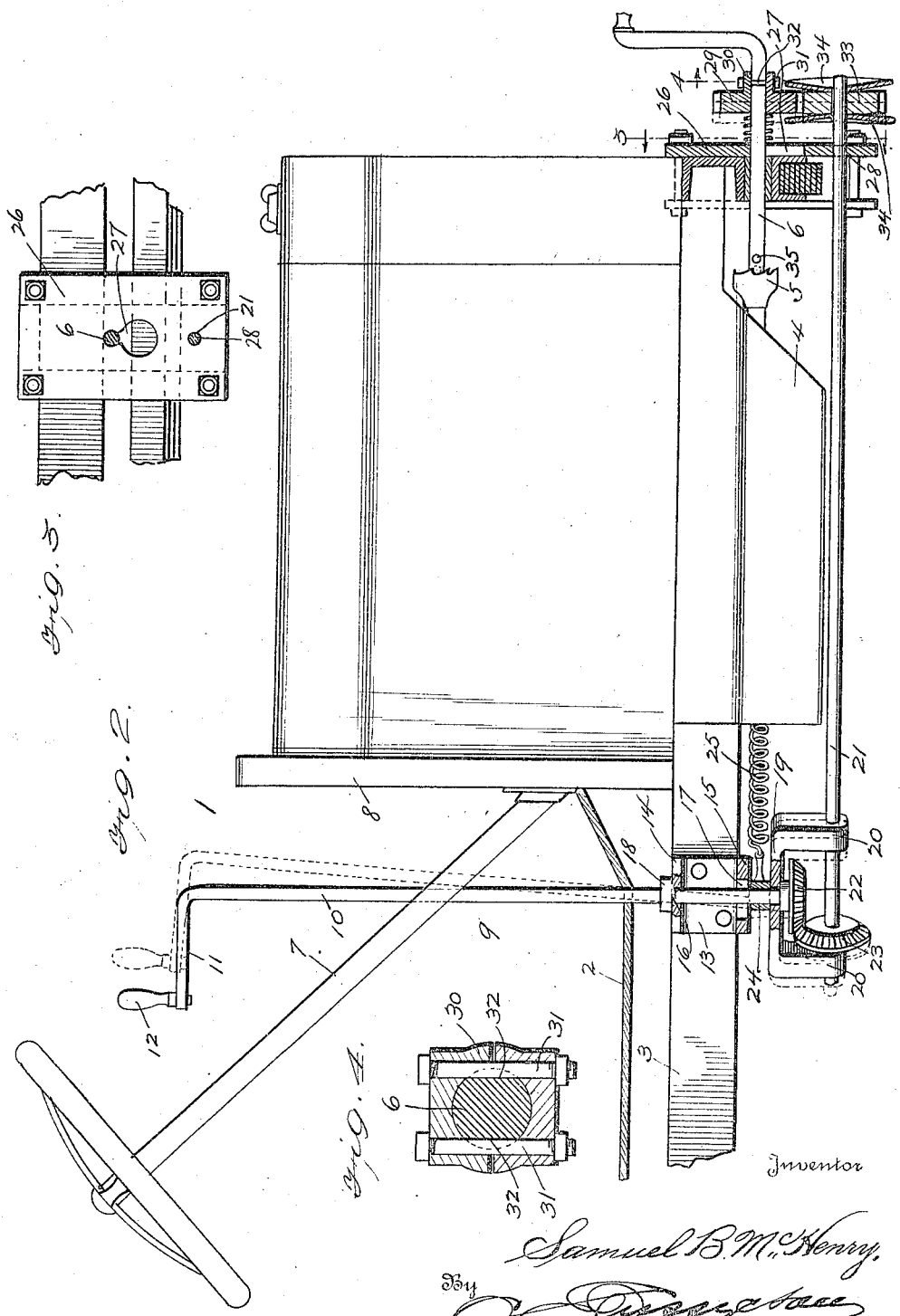

SAMUEL B. McHENRY, OF BLOOMSBURG, PENNSYLVANIA.

AUTOMOBILE-ENGINE STARTER.

1,304,996.  Specification of Letters Patent.  Patented May 27, 1919.

Application filed April 17, 1918. Serial No. 229,070.

*To all whom it may concern:*

Be it known that I, SAMUEL B. McHENRY, a citizen of the United States, residing at Bloomsburg, in the county of Columbia and State of Pennsylvania, have invented certain new and useful Improvements in Automobile-Engine Starters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to automobile engine starting devices, and has for its object to provide a simple engine starting or cranking device, which can be easily and quickly applied to a car and engine without the use of special tools, and without derangement or change to the construction of the car or engine.

Referring to the accompanying drawings:

Figure 1, is a fragmentary plan view of a car of well known type, illustrating my starter in operative position thereon.

Fig. 2, is a view partly in elevation and partly in section showing the starter mechanism.

Fig. 3, is a fragmentary elevation of the front suspending plate, and

Fig. 4, is a vertical sectional view through the hub of the split gear, taken on line 4—4 of Fig. 2.

Like numerals of reference indicate the same parts throughout the several figures, in which:

1, indicates an automobile of well known design, 2 indicates the front floor boards, 3 the chassis frame, 4 the motor base, 5 the crank shaft clutch, and 6 the engine starting crank.

7 indicates the steering post, and 8 the dash.

9 indicates the starter, which includes the vertical shaft 10, having a crank 11 and handle 12. Secured in any manner to the chassis frame 3, is a bracket 13, having an upper flat portion 14, and a lower flat portion 15, the top portion 14, being provided with a round hole 16, and the lower portion 15, being provided with an elongated opening 17, for the passage therethrough of the shaft 10 and to permit the rocking of the shaft manually therein. The shaft 10 is provided with a collar 18 resting upon the upper portion of the bracket 13, the lower end of said shaft 10 passing through a bracket 19 having depending arms 20 within which is journaled the driven shaft 21. A bevel gear 22, carried on the end of the shaft 10, and within the bracket 19, meshes with a bevel gear 23 fast on the driven shaft 21.

These gears can be of any suitable ratio, according to the type of the motor.

Disposed between the two brackets 13 and 19 and on the shaft 10, is a collar 24 carrying a spring 25, normally holding the parts in firm forward position, and against rattling movement.

Applied to the front of the car as shown, is a plate 26, having an opening 27 and a lower opening 28, the former allowing the plate to be passed over the starting crank 6, while the latter opening 28, provides a bearing for the forward end of the driven shaft 21.

Secured to the starting crank 6, is a split gear 29, having a hub 30, the halves being secured together and around the starting crank, by two bolts 31, entering complementary recesses 32 formed in the sides of the starting crank. This construction effectively locks the split gear 29 on the starting crank.

Provided on the front end of the driven shaft 21, is a gear wheel 33, meshing with the split gear 29, said gear 33 having front and rear dished plates 34, greater in diameter than the gear 33, so as to overlap the lower portion of the split gear 29. By means of this construction, longitudinal movement of the driven shaft 21, and gear 33, will move the split gear 29 and the starting crank 6, inwardly and outwardly, so as to engage and disengage the pin 35 of the starting crank with the clutch member 5.

Having thus described the several parts of this invention, its operation is as follows:

To crank the motor in the most convenient manner, and from the driver's seat, the handle 12 and shaft 10 are pushed forward into position shown in dotted lines in Fig. 2, the bracket 13, allowing for this pivoting or rocking movement of the shaft 10. This forward movement of the shaft 10 moves the entire mechanism rearwardly and carries the pin 35 of the starting crank 6, into engagement with the clutch member 5 of the engine crank shaft, and the handle 12, is then rotated, which through the intermediate mechanism rotates the engine crank shaft to start the motor.

Any suitable carbureter priming device can be provided if necessary to assist the ready starting of the motor; while as before stated, any desired gear ratio can be employed to facilitate the rotation of the handle 12, while any obvious changes in the construction and arrangement of the parts can be made without departing from the spirit of this invention as defined by the following claims.

What I claim as new and desire to secure by Letters Patent of the United States, is:

1. An engine starting device, including a driven shaft arranged longitudinally of the engine, an engine starting crank, gearing connecting said shaft with the engine starting crank, a manually operated shaft in rear of the engine, gearing connecting said manually operated shaft with the driven shaft, and means adapted to permit longitudinal movement of the driven shaft and engine starting crank.

2. An engine starting device, including a driven shaft arranged longitudinally of the engine, an engine starting crank, gearing connecting said shaft with the engine starting crank, a manually operated shaft in rear of the engine, gearing connecting said manually operated shaft with the driven shaft and means for effecting the longitudinal movement of the starting crank and the driven shaft, comprising means forming a journal for said driven shaft at one end and controllable by said manually actuated shaft for endwise movement, and means fixed to said driven shaft and adapted to overlap the gear on said engine starting crank.

3. In combination with an automobile engine and starting crank, a longitudinally movable driven shaft, gearing connecting said shaft with the engine starting crank, a manually actuated rotatable and longitudinally movable crank shaft in rear of the engine, gearing connecting the same with said driven shaft to rotate said shaft, and means adapted to permit longitudinal movement of the manually operated crank shaft to longitudinally move the engine starting crank into and out of operative engagement with the crank shaft of the engine comprising means forming a journal for said driven shaft at one end and controllable by said manually actuated shaft for endwise movement, said driven shaft having fixed thereto dished plates upon opposite sides of its gear, adapted to overlap the gear on said engine starting shaft.

In testimony whereof, I affix my signature, in presence of two witnesses.

SAMUEL B. McHENRY.

Witnesses:
INEZ T. WALDEN,
HURLBUT G. WINFIELD.

Copies of this patent may be obtained for five cents each, by addressing the "Commissioner of Patents, Washington, D. C."